(12) United States Patent
Castillo Álvarez

(10) Patent No.: US 9,447,687 B2
(45) Date of Patent: Sep. 20, 2016

(54) HEAT ENGINE, METHOD OF CONTROL OF THE ROTATIONAL SPEED IN A HEAT ENGINE, AND METHOD OF DESIGN OF A CAM PROFILE FOR A HEAT ENGINE

(71) Applicant: Juan Antonio Castillo Álvarez, Málaga (ES)

(72) Inventor: Juan Antonio Castillo Álvarez, Málaga (ES)

( * ) Notice: Subject to any disclaimer, the term of this patent is extended or adjusted under 35 U.S.C. 154(b) by 12 days.

(21) Appl. No.: 14/350,061

(22) PCT Filed: Oct. 3, 2012

(86) PCT No.: PCT/EP2012/069547
§ 371 (c)(1),
(2) Date: Apr. 4, 2014

(87) PCT Pub. No.: WO2013/050425
PCT Pub. Date: Apr. 11, 2013

(65) Prior Publication Data
US 2014/0348678 A1    Nov. 27, 2014

(30) Foreign Application Priority Data
Oct. 5, 2011    (ES) .................................. 201131608

(51) Int. Cl.
*F03C 4/00* (2006.01)
*F04C 2/00* (2006.01)
(Continued)

(52) U.S. Cl.
CPC ............... *F01C 1/067* (2013.01); *F01C 1/063* (2013.01); *F01C 1/07* (2013.01); *F02B 53/00* (2013.01)

(58) Field of Classification Search
CPC .......... F01C 1/067; F01C 1/063; F01C 1/07; F01C 1/077; F02B 53/00; F02B 53/02; F04C 29/00; F04C 14/00; F04C 2230/60; F04C 2230/70

USPC .................. 418/36, 38, 1; 123/241–245
See application file for complete search history.

(56) References Cited

U.S. PATENT DOCUMENTS

| 1,330,629 A | 2/1920 | Gooding, Jr. |
| 2,050,603 A | 8/1936 | Gardner |

(Continued)

FOREIGN PATENT DOCUMENTS

| DE | 413312 C | 5/1925 |
| DE | 4226629 A1 | 2/1994 |

(Continued)

OTHER PUBLICATIONS

International Search Report (ISR) and Written Opinion, International Application No. PCT/EP2012/069547 International Filing Date Oct. 3, 2012, Date of Mailing ISR Jan. 22, 2013, 14 pages, European Patent Office, Rijswijk Netherlands.

(Continued)

*Primary Examiner* — Theresa Trieu
(74) *Attorney, Agent, or Firm* — Peter B. Scull; Hamilton, DeSanctis & Cha, LLP

(57) ABSTRACT

A heat engine comprises two coaxial discoidal sectors and a mechanism of control of the rotational speed of the sectors that makes their respective rotational speeds to vary cyclically between a maximum and a minimum speed. The mechanism includes a linked structure provided with four links arranged in a deformable parallelogram and connected to each other by corresponding rotary joints located at their ends, each link including a roller located adjacent one end of the link. The mechanism further includes at least one cam profile for the rollers to follow, the cam profile being the locus of the path followed by the rollers when the sectors follow a motion such that the speed of each sector is kept at a maximum for at least 90% of the duration of a half-cycle, and is kept at a minimum for at least 90% of the duration of the other half-cycle.

20 Claims, 8 Drawing Sheets

(51) Int. Cl.
  *F04C 18/00*   (2006.01)
  *F01C 1/067*   (2006.01)
  *F01C 1/07*    (2006.01)
  *F01C 1/063*   (2006.01)
  *F02B 53/00*   (2006.01)

(56) References Cited

U.S. PATENT DOCUMENTS

| | | | |
|---|---|---|---|
| 2,271,068 A * | 1/1942 | Gardner | F01C 1/07 418/38 |
| 3,301,193 A | 1/1967 | Moore | |
| 2001/0046446 A1 * | 11/2001 | Kurisu | F01C 1/067 418/38 |

FOREIGN PATENT DOCUMENTS

| | | |
|---|---|---|
| DE | 102005020221 A1 | 11/2006 |
| FR | 546575 A | 1/1922 |
| FR | 627748 A | 10/1927 |
| WO | WO9216728 A2 | 10/1992 |

OTHER PUBLICATIONS

Spanish Search Report and Opinion for Spanish Application No. 201131608, Date of Report, Oct. 25, 2013, 4 pages, Spanish Patent and Trademark Office, Madrid, Spain.

Partial English translation of Spanish Search Report and Opinion for Spanish Application No. 201131608, Date of Report, Oct. 25, 2013, 4 pages, Spanish Patent and Trademark Office, Madrid Spain.

* cited by examiner

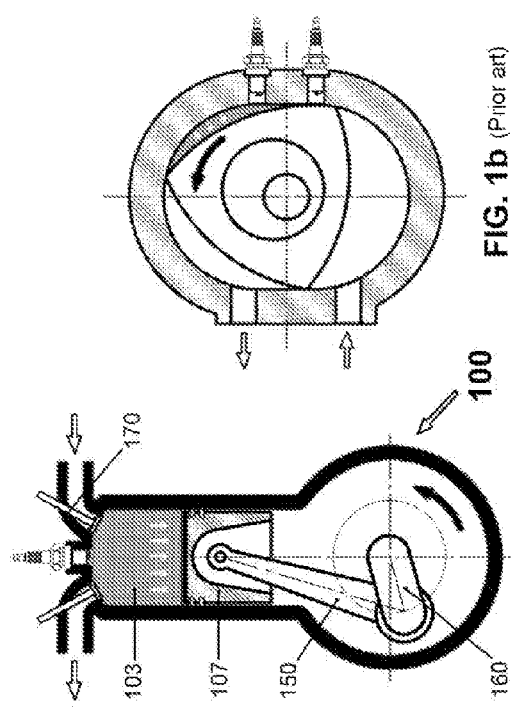
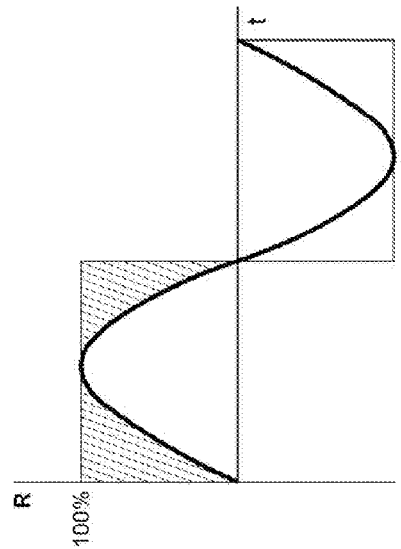
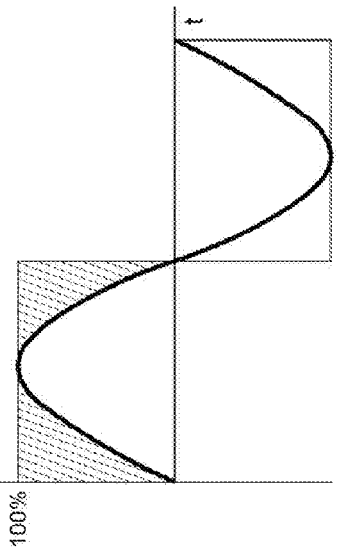
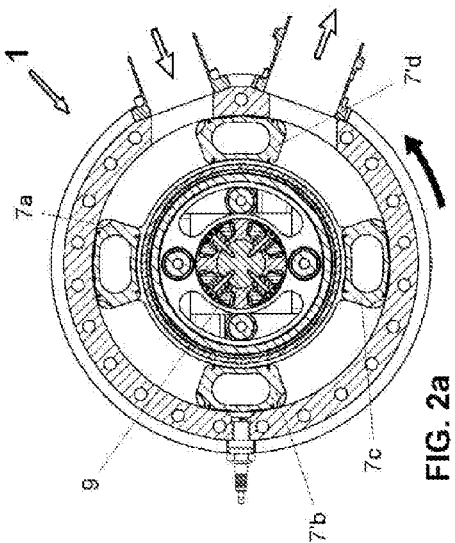
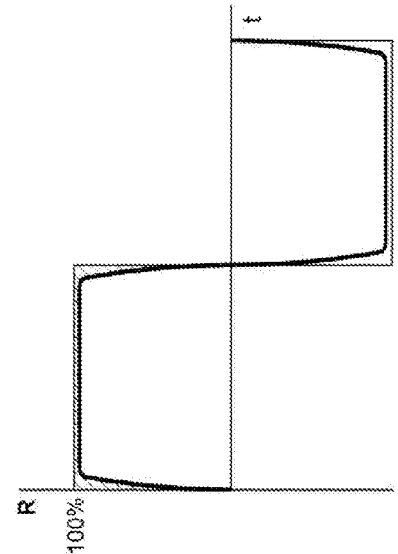
FIG. 1a (Prior art)
FIG. 1b (Prior art)
FIG. 1c (Prior art)
FIG. 2a
FIG. 2b

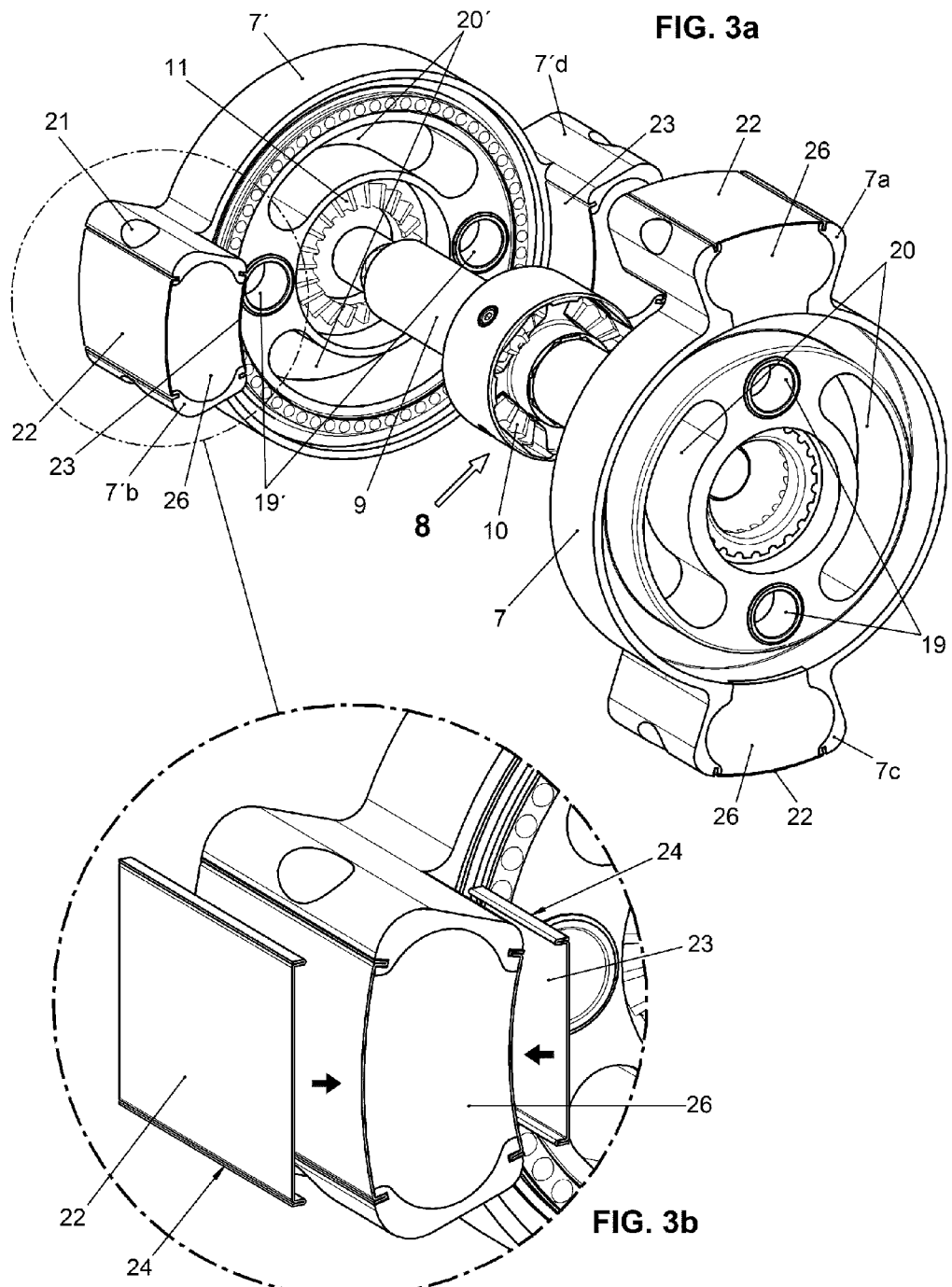

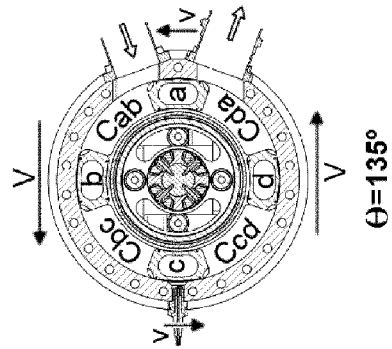
FIG. 5d  Θ=135°
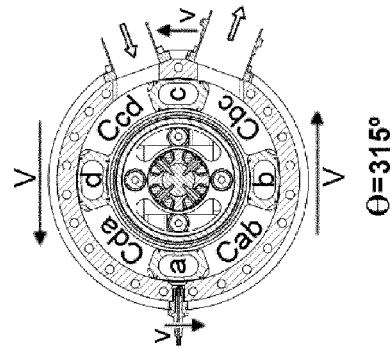
FIG. 5h  Θ=315°
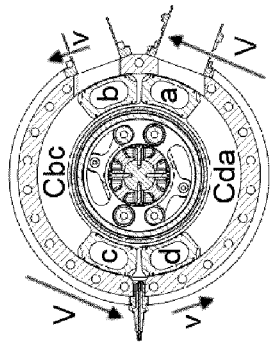
FIG. 5c  Θ=90°
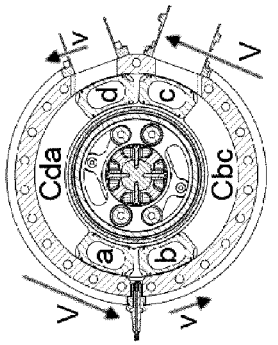
FIG. 5g  Θ=270°
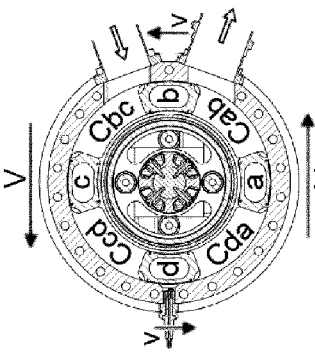
FIG. 5b  Θ=45°
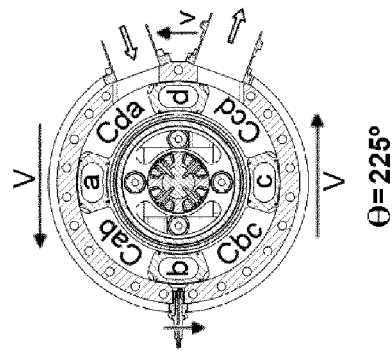
FIG. 5f  Θ=225°
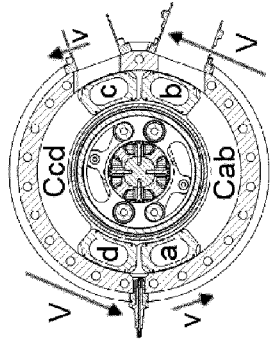
FIG. 5a  Θ=0°
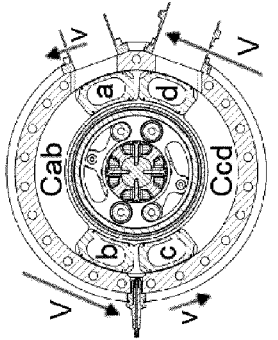
FIG. 5e  Θ=180°

HEAT ENGINE, METHOD OF CONTROL OF THE ROTATIONAL SPEED IN A HEAT ENGINE, AND METHOD OF DESIGN OF A CAM PROFILE FOR A HEAT ENGINE

The invention is related to a heat engine, particularly to an internal combustion engine, comprising a body provided with an annular cavity therein, two coaxial discoidal sectors that jointly define at least four chambers in the annular cavity, and a mechanism of control of the rotational speed of the two discoidal sectors that makes their respective rotational speeds to vary cyclically and in antiphase between a high speed (maximum) and a low speed (minimum), so that the volume of the chambers varies too.

The invention is also related to a method of control of the rotational speed of two discoidal sectors that jointly define at least four chambers in an annular cavity of a heat engine, wherein said rotational speeds vary cyclically and in antiphase between a high speed and a low speed.

The invention is further related to a method of design of a cam profile for a heat engine of the type disclosed above.

BACKGROUND ART

A conventional reciprocating engine comprises an engine body in which the cylinders, normally four, are housed. Corresponding pistons reciprocate inside the cylinders and are linked to a common shaft, named crankshaft, by connecting rods, so that the reciprocating linear motion is converted to a circular motion.

By controlling the input and output of air or air enriched with fuel by means of some valves, the motion of the pistons produce in the cylinders variable volumes that correspond to the four known stages of a 4-stroke internal combustion engine: intake, compression, ignition/combustion/expansion and exhaust. Only during the expansion that takes place in each cylinder on half the revolutions, a torque is produced which drives the crankshaft with a force that is proportional to the consumed fuel, not counting the losses that arise when converting linear motion to circular motion. Theoretically, assuming that the pressure of the combustion gases is constant, the losses are of about 40%. Further losses due to the inertia of the masses in reciprocating motion, and to the friction of the piston against the cylinder wall when the pressure is high, ought to be added.

However, the pressure of the gases in the cylinder in the expansion phase is not constant but presents a high level at the beginning due to the higher temperature and the smaller volume, whereas at the end the pressure is lower because the volume is bigger and the temperature is lower. Besides, there is a residual pressure left that causes a noise in the exhaust pipe the intensity of which increases with the speed and load regime the engine undergoes. In fact, the higher the speed the less the temperature decrease, whereby the combustion is finished in the exhaust pipe. On the other side, the higher the load the more fuel with the right air proportion and the higher pressure at the beginning of the exhaust.

In order to mitigate these drawbacks, rotary internal combustion engines have been proposed, in which the 'pistons' move following a circular motion inside a toroidal 'cylinder', moving closer and moving away to allow for the compression and the expansion, respectively. The efficiency of these engines depends on the control of the variable speed of the 'pistons', since this speed determines the fulfillment of the stages of the engine, and hitherto no control mechanism that significantly improves the efficiency of a rotary engine with respect to the reciprocating engines, and that is further substantially free of mechanical problems, has been proposed; thus no rotary engine of this kind has ever been put to practice.

SUMMARY OF THE INVENTION

It is an object of the present invention to significantly increase the efficiency of known internal combustion engines without impairing mechanical reliability. In this context, the concept 'internal combustion engine' can be extended to the more general concept of heat engine which exchanges work and energy and includes compressors or pumps.

According to a first aspect of the invention, the mechanism of control of the rotational speed of the two coaxial discoidal sectors comprises a means for keeping the speed of each discoidal sector at a substantial maximum for at least 80% of the duration of a half-cycle, preferably at least 90%, and for keeping the speed of each discoidal sector at a substantial minimum for at least 80% of the duration of the other half-cycle, preferably at least 90%. That is, the volume of the chambers, which is variable and is given by the coaxial discoidal sectors moving closer and away from each other, varies linearly nearly all the time, since the difference of speed of the sectors is constant nearly all the time.

In the state of the art, the speed follows a complete pseudo-sinusoidal curve in each cycle, so that each sector reaches the high or low speed at just one point and the difference of speeds is maximum at just these points (the speeds are in antiphase, i.e., the speed of one sector increases when the speed of the other sector decreases, and vice versa), whereas, with the present invention, the difference of speeds is maximum nearly all the time, whereby the force of the expansion moves at this maximum difference nearly all the time and the generated power (which is force times speed) is also maximum nearly all the time.

The change of speed between high and low, or vice versa, takes 5 or 10% of the cycle, approximately (the half of 10 or 20%, since there are two changes, between maximum and minimum and between minimum and maximum), which limits the resulting accelerations and therefore the mechanical stresses.

An engine according to the invention could be named 'logical engine', because the speed of the sectors practically adopts just two values, high and low, which is analogous to the logical values 'true' and 'false', 'all' and 'nothing' or '1' or '0'.

According to another aspect of the invention, the rotational speeds of the coaxial discoidal sectors vary cyclically and in antiphase between a maximum speed and a minimum speed, characterized in that the speed of each discoidal sector is kept at a substantial maximum for at least 80% of the duration of a half-cycle, preferably at least 90%, and is kept at a substantial minimum for at least 80% of the duration of the other half-cycle, preferably at least 90%.

Preferably, the ratio between the maximum speed and the minimum speed (which can be designated as k) is between 4 and 5, because if k is very low the engine is little efficient, and if k is very high the mechanical stress, and thus the wear, is excessive.

According to a further aspect of the invention, the shape of the profile is designed from a determined motion of the discoidal sectors by building the locus of the path followed by the rollers, in a sort of reverse engineering.

Other optional features of the invention are defined in the appended dependent claims.

Considering that the thermal cycle is the same as the known Otto an Diesel cycles, the new engine of the present invention is designed to take more advantage of the pressure of the gases during the expansion, thus improving the mechanical efficiency as compared to the current internal combustion engines, and achieving a reduction in fuel consumption, as well as in pollution.

Specifically, the engine of the invention manages to transmit approximately the 92% or the generated power, in contrast with the approximately 60% of the power generated by the conventional engines.

In order to achieve this efficiency, the present invention is essentially made of an assembly of rotary parts that are responsible for the creation of the spaces needed for power generation, elements that control the motion of the rotary parts, and speed integration means that transmit the motion of said rotary parts to the shaft of the engine. More specifically, the rotary parts are named 'sectors' and move inside an annular cavity with a rotational motion the speed of which is variable but without a change of sense (i.e., without reciprocating) and in antiphase. The control elements force the motion of said sectors so as to produce the known stages of an internal combustion engine: intake, compression, ignition/combustion/expansion and exhaust. In the third place, the speed integration means integrates the variable rotational motions of the sectors to convert them into a rotational motion of the shaft with a mean and uniform speed.

More specifically, the new internal combustion engine of the invention comprises the following parts: a body, a first discoidal sector and a second discoidal sector, a speed control means for controlling the speed of the sectors, a shaft, and a speed integration means for integrating said speeds. Each of these parts is presently described in more detail.

a) Body

The body of the engine comprises a cavity with a substantially annular shape provided with at least one intake orifice, at least one exhaust orifice and at least one spark plug or an injector (depending on whether the engine is Otto or Diesel).

The annular cavity can be assimilated to the cylinders in a combustion engine, because the chambers of intake, compression, ignition/combustion/expansion and exhaust will be formed in the cavity thanks to the motion of the so-called 'tangential pistons' therein; said tangential pistons will be described below. The expression 'substantially annular' refers to a cavity of approximately toroidal shape, the cross-section of which may have different shapes, like a circle, a square or a rectangle.

In principle, the relative positions of the spark plug or the injector and of the intake and exhaust orifices, and the size of said orifices, can be variously designed according to the operation mode of the engine. However, in an embodiment of the invention the intake orifice and the exhaust orifice are located in a region of the cavity opposite the region where the spark plug or the injector is, specifically at a position slightly forward or backward with respect to the point opposite the spark plug or the injector. The purpose of these positions will be clear from the subsequent detailed description of an embodiment.

b) First Discoidal Sector and Second Discoidal Sector

These are sectors with a substantially discoidal shape; the sectors are equal and complementary, i.e., they fit sidewise with each other and at the same time allow a rotational motion relative to each other.

Each or these sectors is provided with at least two tangential pistons located opposite at the periphery thereof and radially and axially projecting therefrom, said tangential pistons being configured to slide pressureless inside the annular cavity. That is, the shape of the tangential pistons is such that they fit perfectly in the cavity, whereby they can rotationally slide pressureless therein. So, when the sectors are assembled one next to the other, the relative rotation of one sector with respect to the other ends up causing one sector's tangential pistons to get near the other sector's tangential pistons. In this way, the four tangential sectors and the cavity delimits four chambers the volumes of which change as the sectors move, thus causing the succession of the stages intake, compression, ignition/combustion/expansion and exhaust.

In an embodiment, the front and rear outer edges of the tangential pistons further comprise two cavities, the function of which is to provide a volume for the fuel and/or the gases when two tangential pistons are close to each other (which occurs at the beginning of the ignition stage and at the end of the exhaust stage). In this respect, it is worth mentioning that, at the beginning of the ignition stage, the centrifugal force itself causes the fuel, which is heavier than the air, to accumulate at the outer region of the chamber, thus improving the start of the explosion.

c) Means for Controlling the Speed of the Sectors

This control means are configured for the absolute rotational speed of the sectors to alternate between a high (maximum) speed and a low (minimum) speed, so that the tangential pistons move inside the cavity to generate variable volume chambers to carry out the stages of an internal combustion engine. That is, when the explosion is produced, the two tangential pistons that delimits that chamber (and hence the sectors to which they belong) are subjected to a force tending to separate them in opposed senses of rotation. The control means have a configuration that manages to 'lever' one of the tangential pistons (actually, the sector to which the tangential piston belongs), which will move at the low speed, thus causing the force generated by the pressure of the gases to throw the other tangential piston (the other sector) forward at the high speed. Theoretically, the optimum low speed would be zero, which would mean that a tangential piston would not move, though for practical reasons, described below, a particularly useful embodiment of the invention presents a low speed above zero. In any case, it will be understood in this description that the term 'low speed' or 'minimum speed' may comprise a zero speed.

In principle, the control means could be configured in different ways, although, according to a preferred embodiment of the invention, a linked structure is used, the motion of said linked structure being restricted by a cam profile, and said linked structure being connected to the sectors by means of some bars. This configuration allows the use of cam profiles suitable to, through the linked structure, force the sectors to cyclically perform the motions needed to obtain the desired variations in the volume of the chambers. In other words, the cam profile can be 'programmed' depending on the use of the engine, in order to achieve different combinations between the low and high speeds to get the optimum results regarding the working conditions of each use, for instance low power, high power, fixed load, variable load, fixed speed, variable speed, car, plane, boat, static, etc.

The cam profile is preferably arranged perpendicularly to the shaft, in the plane of the linked structure. Preferably, an assembly 'linked structure-cam profile' is arranged on each side of the sectors, in order to achieve a balanced force distribution. As already mentioned, the cam profile is designed so that the sectors swap between the low and high speeds stepwise, that is, so that the speed swapping time is short as compared to the constant speed time. To do this, the cam profile follows a closed curve similar to a pseudo-epicycloid of two lobes with an orientation suitable for the motions of the tangential pistons to occur at the intended locations.

In an embodiment, the linked structure comprises four links connected to the bars at the midpoints of the former, by means of rigid joints. The links are further connected to each other by means of rotary joints located at their ends. Besides, each link comprises a roller located adjacent one end thereof, the rollers being configured to roll along the cam profiles.

As already mentioned, the linked structure is joined to the sectors with rotational freedom by means of the bars. In an embodiment, a first pair of bars passes through two diametrically opposite orifices made in the first sector and through two diametrically opposite tangential slots made in the second sector, and a second pair of bars passes through two diametrically opposite tangential slots made in the first sector and through two diametrically opposite orifices made in the second sector.

d) Transmission Shaft

It is the shaft that transmits the torque generated by the engine during the stage of ignition/combustion/expansion, and is concentrically disposed in the annular cavity. This shaft supports the sectors through roller bearings.

e) Speed Integration Means

It is the element that allows to transmit to the shaft the torque generated by the engine, which is transmitted to the sectors as two speeds of different magnitude: the low speed and the high speed. In order to do so, this integrations means joins the first sector, the second sector and the shaft, in such a way that the rotational speed of the shaft is, for example, the mean of the speeds of the first sector and the second sector.

In principle, the integration means can be designed in different ways, though, in a preferred embodiment of the invention, the integration means comprise conical pinions fixed to the shaft, preferably four pinions uniformly spaced around the shaft and engaged to crown wheels provided in the first and second sectors. Thus, when one sector moves at high speed and the other moves at low speed, the shaft moves at the mean speed. The speed control means of the sectors are designed to make the change of speed between low and high speed simultaneous and in antiphase for both sectors, so that the shaft keeps uniformly rotating at the mean speed all the time.

It is noted that this connection still leaves one degree of freedom, since the motions of the three elements that are connected (first sector, second sector and shaft) are not univocally determined by the motion of one of these elements. The speed control means establishes the additional bind that is needed to force certain relative motions of the sectors, so that, although these motions alternate between high and low speed, the generated torque is transmitted to the shaft with the latter rotating at the mean speed of the sectors, which is constant if the difference between the high speed and the low speed is kept constant.

Since the coaxial discoidal sectors and the rest of the elements present a symmetry with respect to the rotation axis, the center of gravity of the group of moving elements lies on the rotation axis, which is advantageous in order to reduce vibrations.

The sum of the angular momentums of each moving element is constant, which means that the overall momentum is constant, which implies that no inertia is lost in the way of the change of motion.

Moreover, although it is not specifically disclosed in this description, it is understood that the cooling of this new engine should be suitable for the materials employed in each type of construction, taking into account that the temperature of the body block must be homogeneous within a margin considered acceptable for the proper operation of the engine, and should not impair the lubricant contained therein.

Regarding the lubricant employed and the lubrication of the parts subjected to loads, they will depend on the materials and the type of construction in view to achieve the best practical results.

The operation of this new engine will be briefly described below, starting in a position in which one of the four chambers is about to begin the expansion stage. It will be appreciated how the changes of volume of this chamber are similar to those of a conventional linear piston, though in this case the chamber is delimited by two consecutive tangential pistons and moves tangentially around the annular cavity going through the four stages of an internal combustion engine in each turn.

At the very beginning, the chamber is delimited by two tangential pistons located one next to the other, the air or the air with fuel being confined to the small volume that exists between them. Once the explosion is produced (by the spark plug in the case of a gasoline engine), the expanding gases exert a force on both tangential pistons and, therefore, on the two sectors, said force aiming to rotate them in opposed senses. However, the linked structure, together with the cam profiles and the bars, causes the levering of the sector corresponding to the backward tangential piston, said sector thus moving at the low speed, while the forward tangential piston is allowed to shoot forward at the high speed. The cam profile is configured for the acceleration of one sector to coincide with the deceleration of the other sector in the first and last 5% to 10% of each cycle and each piston. During this phase, this chamber is called 'expansion chamber'.

The expansion phase of this chamber ends when the forward tangential piston moves past the exhaust orifice, as at this moment the residual gases of the combustion start leaving the chamber.

Simultaneously, the expansion in the following chamber causes this backward tangential piston to be pushed forward at the high speed, thus making the residual gases in the chamber to go out through the exhaust orifice. Note that the position of the forward tangential piston itself leaves open the exhaust orifice, keeping it apart from the intake orifice, and the backward tangential piston, in its new fast race pushes the residual gases of the combustion without the need of using valves, whereby this new engine is mechanically simpler than the conventional engines. During this phase, the chamber is called 'exhaust chamber'.

Once the exhaust phase of this chamber is ended, during which the forward tangential piston has moved at the low speed, said forward tangential piston reaches the intake orifice. Once again, the intake is carried out without the need of valves, since at that moment the opposite tangential piston (which belongs to the same sector) is pushed forward at the high speed because of the expansion phase of another chamber and, therefore, forces the forward tangential piston of the present chamber to move at the high speed, which causes a low pressure that draws air, or air and fuel, into said chamber. This phase is ended when the forward piston approaches the region of the spark plug or the injector. During this phase, the chamber is called 'intake chamber'.

The phase of compression is then effected. The so-called forward piston now moves at the low speed, while the so-called backward piston approaches the former at the high speed (because of the expansion of a different chamber that is pushing the opposite tangential piston of the same sector), thus causing the compression of the gases. This phase ends when the initial position is reached again, where the present chamber is ready for a new explosion and the subsequent expansion. During this phase, the chamber is called 'compression chamber'.

Like in the reciprocating engines of linear cylinders, the same chamber is given different names depending on the phase of the cycle that is being effected at each moment. However, since the new engine of the invention comprises at least four of these chambers that simultaneously carry out the complete cycles of intake, compression, ignition/combustion/expansion and exhaust, four power phases are generated at each turn of the shaft, whereas a conventional reciprocating engine must have eight cylinders for achieving four power phases at each turn of the shaft. This indicates that, for an equivalent engine size, the engine of the invention generates twice the power, or else it is possible to get the same power with an engine half the size.

Lastly, note that it is possible to have combinations where each sector has more than two tangential pistons. In this case, it would be necessary for the cavity to have several intake orifices, several exhaust orifices, and possibly several injectors or spark plugs, since the explosion/expansion would not always be produced at the same position in the cavity. The cam profiles might in this case comprise more than two lobes. This kind of configurations are called 'star' configurations. It would also be possible to design configurations consisting of piling several single engines in battery, called 'tandem' configurations. Both configurations can of course be combined in 'star-tandem' configurations.

BRIEF DESCRIPTION OF THE DRAWINGS

A particular embodiment of the present invention will be described in the following, only by way of non-limiting example, with reference to the appended drawings, in which:

FIGS. 1a and 1b respectively show the conventional systems of a reciprocating one-cylinder engine and a Wankel rotary engine, and FIG. 1c shows a graphic of the efficiency of power transmission R with respect to the time t for these known engines, where the hatching represents the power lost in the conventional systems;

FIGS. 2a and 2b schematically show an engine according to the invention and a graphic of the efficiency of power transmission with respect to the time of a tangential piston of this engine, where the hatching represents the power lost by said tangential piston;

FIGS. 3a and 3b respectively show a perspective view of two discoidal sectors disassembled from their position on the shaft of the engine, and an enlarged view of the original and assembled shape of a radial retainer;

FIGS. 5a-5h show the different positions of the tangential pistons and the shaft along a complete turn of the latter;

DESCRIPTION OF PREFERRED EMBODIMENTS

Figure 4A:
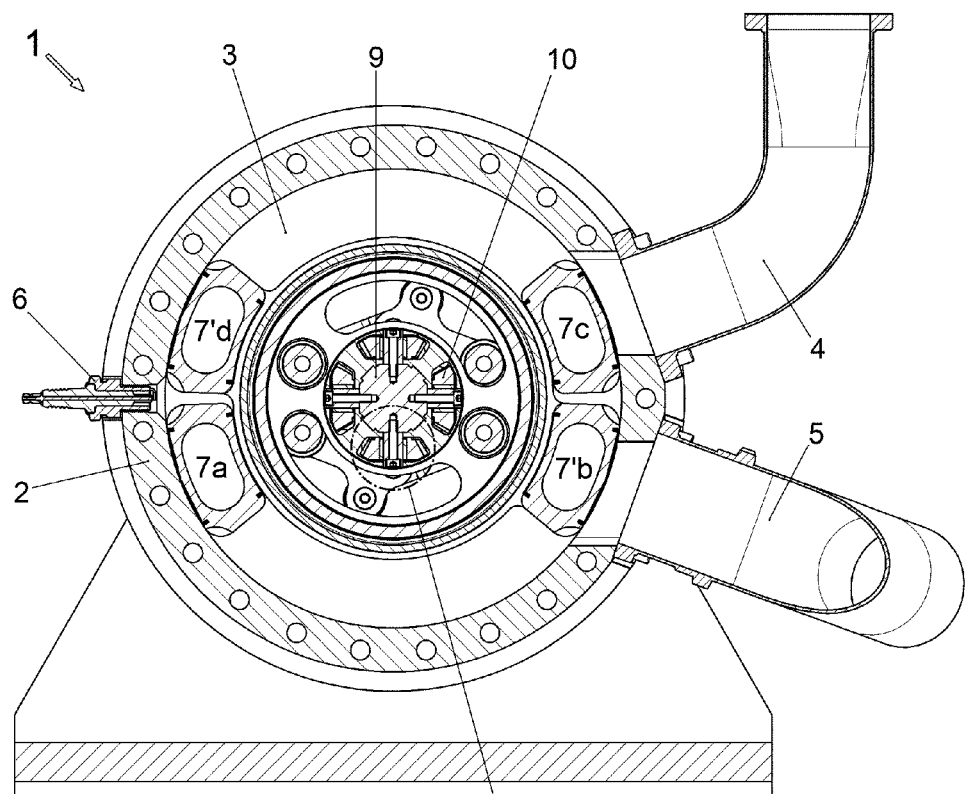
FIGS. 4a and 4b show a cross-section of the engine of the invention where it can be appreciated the position of the tangential pistons and the shaft, and an enlarged view of a speed integration means.

The invention is presently disclosed by reference to the figures. The operation of a conventional combustion engine 100 will be briefly described in the first place; said engine is provided with pistons 107 that move in a linear cavity 103, as shown in FIG. 1a. As it is well known, it is necessary to transform the reciprocating linear motion of the pistons 107 in a rotational motion by means of a connecting rod 150 and a crank 160. The valves 170 has been represented too, as they are needed to allow the input and output of air, air and fuel, or residual gases; said valves 170 must be acted upon at exact times, for which a complicated camshaft (not shown) is used. It is also shown in FIG. 1b a known engine of the Wankel type.

As a consequence of the transformation of the linear motion of the piston 107 in a rotational motion of the shaft, the speed of the piston 107 varies in accordance to a pseudo-sinusoidal curve.

The motion that ideally would manage to generate the maximum efficiency would be a square wave of the same amplitude and phase, shown in FIG. 1c (note that this is a purely theoretical exercise, since infinite accelerations, and hence stresses impossible to bear by current materials, would be produced). It can thus be graphically appreciated that the losses produced as a consequence of the geometrical configuration of the conventional engines only (without taking into account friction and associated losses), can be as high as 40% of the available power.

Instead, the engine 1 of the present invention, shown in FIG. 2a, is geometrically configured in such a way that the force generated during the expansion is directed in a tangential direction. Consequently, in this case the power losses correspond, in FIG. 2b, to the region comprised between the pseudo-trapezoidal wave, which represents the power transmitted by a tangential piston 7a, 7c, 7'b or 7'd, to the shaft 9, and the square wave of higher amplitude and same phase that is equivalent to the delivered power. It is readily seen the big improvement in the efficiency brought about by the engine 1 of the invention.

The present particular embodiment of the engine 1 comprises two discoidal sectors 7 and 7', each having two tangential pistons 7a and 7c or 7'b and 7'd, see FIG. 3a. This is the simpler configuration because only one intake orifice 4, one exhaust orifice 5 and one injector or spark plug 6 are required, see FIG. 4a. This engine 1 will be described in the following order: first the motion of the discoidal sectors, then the action of the motion controlling means, and lastly the integration of the speeds of the discoidal sectors 7 and 7'.

1) Motion of the Discoidal Sectors 7 and 7'

FIG. 3a shows the first discoidal sector 7 and the second discoidal sector 7', out of their working position on the shaft 9. The discoidal sectors 7 and 7' are shaped as two substantially equal discs that fit each other, and each is provided with a pair of tangential pistons 7a and 7c or 7'b and 7'd, located along the outer perimeter of the discoidal sectors in diametrically opposite positions. It can be appreciated how both discoidal sectors can rotate with respect to each other only a determined angle of less than 180°, since eventually the tangential pistons 7a and 7c of one discoidal sector 7 hit the tangential pistons 7'b and 7'd of the other discoidal sector 7', because all pistons outwardly project from the discoidal sectors in the axial direction. In this example, the tangential pistons are hollow to reduce the forces of inertia and the amount of material necessary to manufacture them. These hollow spaces are covered by lids 26.

Figure 4B:
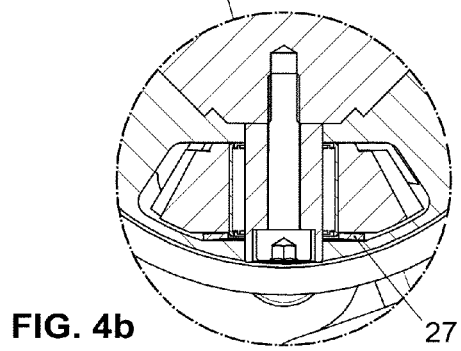

FIG. 4a shows a cross-section of the engine 1 with the discoidal sectors 7 and 7' assembled. It can be seen how the body 2 comprises an annular cavity 3 therein, inside which the four tangential pistons, 7a, 7c, 7'b, 7'd, move. It can also be seen the position of the intake orifice 4 and the exhaust orifice 5, as well as the position of the injector or the spark plug 6. The engine comprises conical pinions 10 fixed to the shaft 9, and elastic washers 27 to reduce the play between said conical pinions (FIG. 4b) and the crown wheels 11 (FIG. 3a). The tangential pistons further comprise radial retainers 22 and 23, shown in detail in FIG. 3a (already assembled) and in FIG. 3b (before assembling). The main function of these radial retainers is to obtain the best possible seal between the pistons 7a, 7c, 7'b, 7'd, the cavity 3 and the discoidal sectors 7 and 7' themselves, with the largest possible surface of contact to reduce wear and keep the laminar flow front between said surfaces. To this end, the retainers 22 and 23 are configured as flat sheets (see FIG. 3b) that are elastically bended during their assemblage (see FIG. 3a) at the outer and inner regions of the tangential pistons. Thus, in the seals of the inner region, the own bias of the retainers 23 towards regaining their flat shape contributes to the maximum sealing of the tangential pistons against the discoidal sectors. On the other hand, at the outer region, the centrifugal force acting on the retainers 22 also contributes to improving the sealing against the surface of the annular cavity 3. The retainers 22 and 23 further comprise edges 24 at the ends thereof, called scratching edges, the function of which is to prevent the entry of residues in the contact zone between the tangential piston, the annular cavity and the discoidal sectors.

The stages that are produced every 45° during one turn of the shaft 9 are presently described by reference to FIGS. 5a-5h, which show cross-sections of the engine 1 analogous to those of FIG. 4a. It can be seen how there is a space between each pair of tangential pistons, said space being a chamber C. In this description, reference is made to each particular chamber by means of subscripts that indicate the tangential pistons 7a, 7'b, 7c, 7'd that delimits it: Cab, Cbc, Ccd and Cda. Because of the configuration of the control means, that will be described in more detail below, in this embodiment the tangential pistons can only move at two speeds: a low speed represented by 'v' and a high speed represented by 'V'. Reference is made to the angle of rotation of the shaft by the letter θ. Lastly, in order to simplify the notation in this description, the pistons are named by its letter only: a, b, c, d, in place of 7a, 7'b, 7c, 7'd.

FIG. 5a: the reference of the angle of rotation of the shaft is at 0°; in this moment the engine 1 is in a state just before the expansion, which has not started yet. The tangential piston a still moves at the low speed v, while the tangential piston d, which has just reached the high speed V, has caused the compression of the chamber Cda. The ignition of the fuel injection that will cause the explosion is effected precisely in this moment.

FIG. 5b: upon the explosion in chamber Cda, the tangential piston a shoots forward and accelerates to the high speed V, while the piston d simultaneously brakes to move at the low speed v. These motions are forced by a linked structure 12 in combination with a cam profile 12, as will be explained in detail below. Hence, the chamber Cda is expanding and thus power is being generated. Besides, since the piston d is moving at the low speed v, the piston b is also moving at the low speed v and, equivalently, since the piston a is moving at the high speed V, the piston c is also forced to move at the high speed V. Consequently, at the same time that the expansion is taking place in the chamber Cda, the exhaust is taking place in the chamber Cab, the intake in the chamber Cbc and the compression in the chamber Ccd. Note how, in contrast with the combustion engines known in the art, no valves are needed for the intake and the exhaust, since the tangential pistons a, b, c, d, themselves successively cover and uncover the intake orifice 4 and the exhaust orifice 5 at precise times, and the overpressures and underpressures that take place in the chambers Cab, Cbc, Ccd, Cda, due to the different speeds of the tangential pistons a, b, c, d, that delimit said chambers, are enough to cause the evacuation of the combustion gases during the stage of exhaust, and the intake of air or air and fuel during the stage of intake. It is remarked how, between FIGS. 5a and 5b, the shaft 9 has rotated approximately 45° at a constant speed that is the mean of the high speed V and the low speed v, i.e., vshaft=(V+v)/2. This is achieved thanks to a speed integration means 8 that is described in detail below.

FIG. 5c: the piston a, which is moving at the high speed V, reaches the piston b, which is moving at the low speed v. This moment is equivalent to that of FIG. 5a, but now just before the explosion in the chamber Ccd, and equivalently just before the starting of the exhaust in the chamber Cda, which has been taken as reference in this explanation. The shaft 9 keeps rotating at constant speed and has rotated 90° since the beginning.

FIG. 5d: once the piston a moves past the position of the exhaust orifice, with said piston a moving at the low speed v, the exhaust stage starts in the chamber Cda. The reduction of volume in the chamber Cda, due to the difference of the speeds of piston d and piston a, forces the exit of the exhaust gases without the need of any valve.

FIG. 5e: the piston d has just reached the piston a and has covered the exhaust orifice 5. The intake stage is about to begin in the chamber Cda, and will start when piston a moves past the position of the intake orifice 4. Note that piston a is about shooting forward at the high speed V, since the expansion in the chamber Cbc will cause the acceleration of piston c, which belongs to the same sector 7 of piston a. Until now the shaft 9 has rotated 180° and two expansions have been effected, in the chambers Cda and Ccd.

FIG. 5f: the expansion in the chamber Cbc causes pistons c and a, which belong to the same discoidal sector 7, to shoot forward at the high speed V. The fast increase of volume in chamber Cda creates an underpressure that causes the intake of air or air and fuel through the intake orifice 4.

FIG. 5g: the intake into chamber Cda has just ended. Piston a is about to brake to the low speed v in order to be levered during the expansion that is about to be effected in chamber Cab. The shaft 9 has rotated 270° until now.

FIG. 5h: the moment in the cycle immediately before the one represented in FIG. 5a is reached. Piston a moves at the low speed v, while a compression is taking place in chamber Cda. It is remarked that, ideally, it would be possible to force the low speed v to be zero, by suitably designing the cam profile 13.

2) Action of the Motion Control Means

Figure 6:
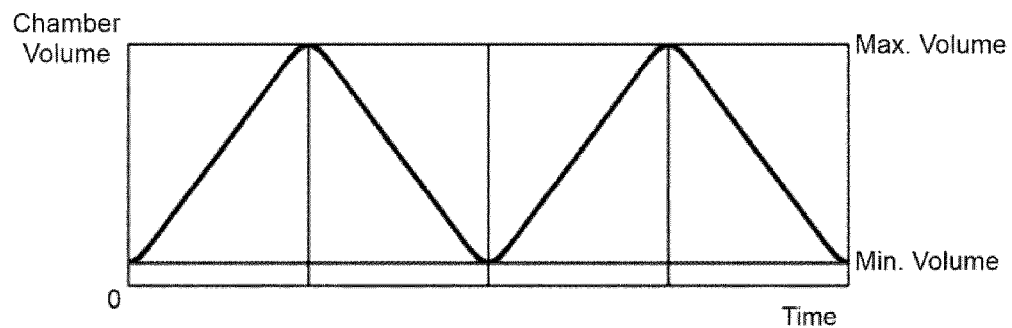
FIG. 6 shows a graphic of the volumes of a chamber with respect to the time.

As explained by reference to FIG. 1c, with the conventional combustion engines, both reciprocating and rotary Wankel, the transmitted power varies according a pseudo-sinusoidal curve. With the present engine 1, the motion of the discoidal sectors 7 and 7' can be forced to be the most suitable for each particular application, approaching the ideal situation as much as desired. In this embodiment, the specific design of the cam profile 13 causes the speeds of the tangential pistons 7a, 7c, 7'b, 7'd, and therefore the speeds of the discoidal sectors 7 and 7', to change from the high speed V to the low speed v, and vice versa, in accordance to the graphic shown in FIG. 7. That is, the speeds of the discoidal sectors 7 and 7' are practically constant most of the time, since the change of speed is produced in a very short time (approximately 5% of the time of each stage of the combustion). This speed variation makes the volumes of the chambers to change almost linearly, so that when the speed is high and uniform the chamber is linearly filled, and when the speed is low and uniform the chamber is linearly emptied, and, in the changes of cycle, the volume of the chamber is maximum or minimum depending on the change, as can be seen in FIG. 6.

Besides, it is necessary to transmit the motion of the discoidal sectors 7 and 7' to the shaft 9 as a uniform speed, since when the first discoidal sector 7 moves at the low speed v the second discoidal sector 7' moves at the high speed V, and vice versa. As will be explained in detail below, in this embodiment the speed integration means 8 is designed to transmit to the shaft a speed that is the mean of the speeds of the two discoidal sectors 7 and 7'. Consequently, in this embodiment the cam profile 13 is also designed to keep the sum of the speeds of the first discoidal sector 7 and the second discoidal sector 7' uniform at all times, even during the transitions between the high speed V and the low speed v. This particular speed profile correspond to a cam profile 13 shaped as a pseudo-epicycloid of two lobes.

Figure 7:
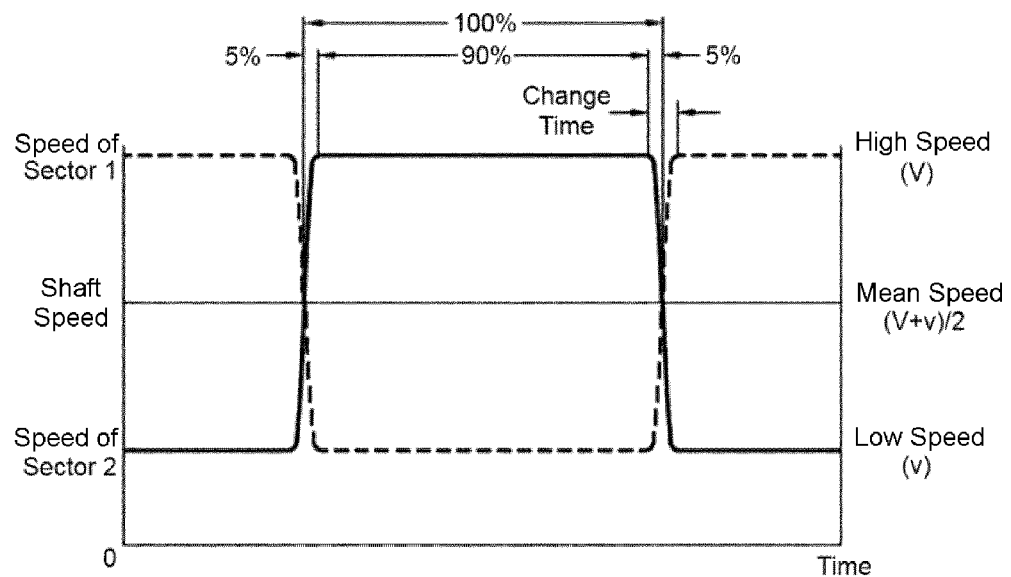
FIG. 7 shows a graphic of the speeds of the two discoidal sectors with respect to the time.

Moreover, the flanks of ascent and descent of the trapezoidal wave of speeds represented in FIG. 7 have a shape corresponding to the fourth part of a sinusoidal wave, thus smoothing to a degree the transition between the high and low speeds of the tangential pistons 7a, 7c, 7'b, 7'd, so as to minimize the probability of mechanical breakages.

Figure 8:
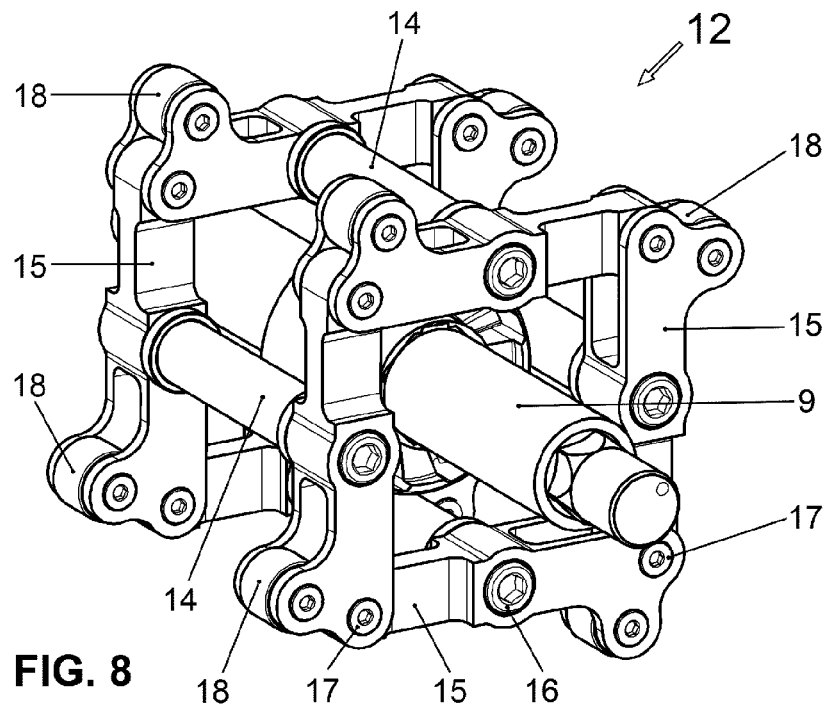
FIG. 8 shows a linked structure that is a part of the speed control means.

The control means that binds the discoidal sectors 7 and 7' to have their speeds right comprise a linked structure 12 in combination with a cam profile 13. FIG. 8 shows an example of a double flat linked structure 12, which minimizes and balances the forces that act on the assembly. Each individual linked structure 12, which is a deformable parallelogram, comprise four links 15 that are rigidly connected to some bars 14 by means of first rigid joints, called bar joints 16, that are located approximately at the midpoint of each link 15. In turn, the links 15 are connected to each other by means of second rotary joints, called link joints 17, that are located at their ends. The adjective 'deformable' does no mean that the links are deformable, but that the parallelogram can swap between a square and a rhombus.

Figure 9:
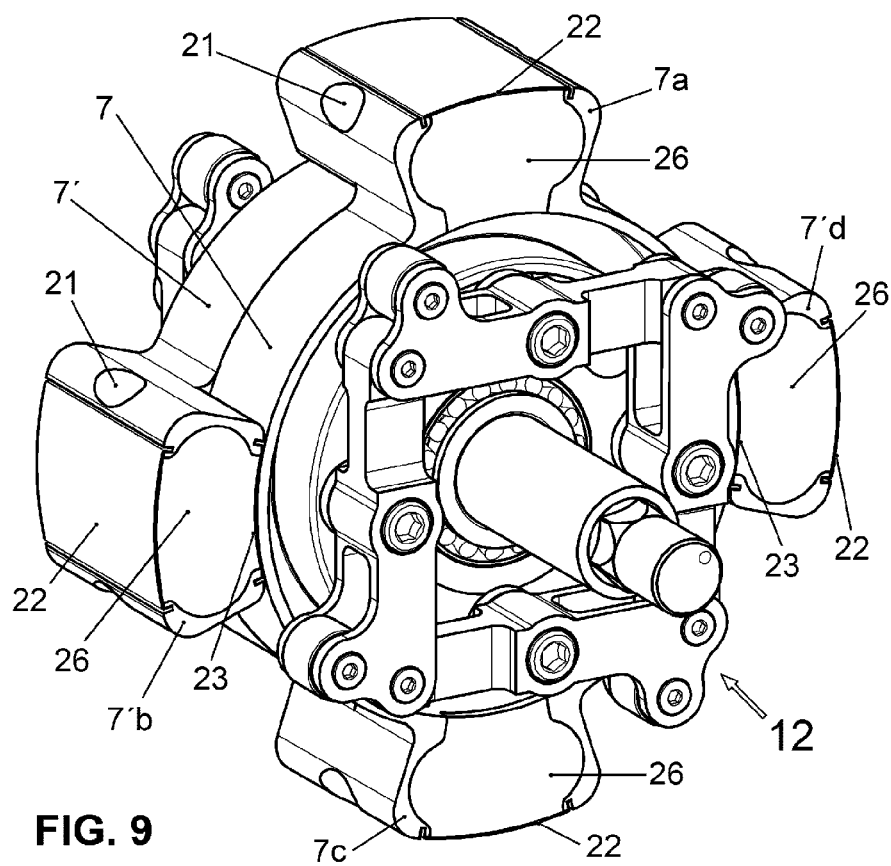
FIG. 9 shows the linked structure bound to the discoidal sectors.

The bind between the linked structure 12 and the discoidal sectors 7 and 7' is provided by the bars 14. To understand the way in which these elements are bound it is necessary to watch FIG. 8 in tandem with FIG. 3a. FIG. 3a shows how each discoidal sector 7 or 7' has two opposite orifices 19 and 19' and two opposite tangential slots 20 and 20'. Now, a first pair of bars 14 passes through two opposite orifices 19 of the first discoidal sector 7 and two opposite tangential slots 20' of the second discoidal sector 7', while a second pair of bars 14 passes through two opposite tangential slots 20 of the first discoidal sector 7 and two opposite orifices 19' of the second discoidal sector 7'. The result is represented in FIG. 9, which shows the discoidal sectors 7 and 7' fitted to each other and bound to the linked structure 12 by means of the bars 14, which are hidden.

Figure 10:
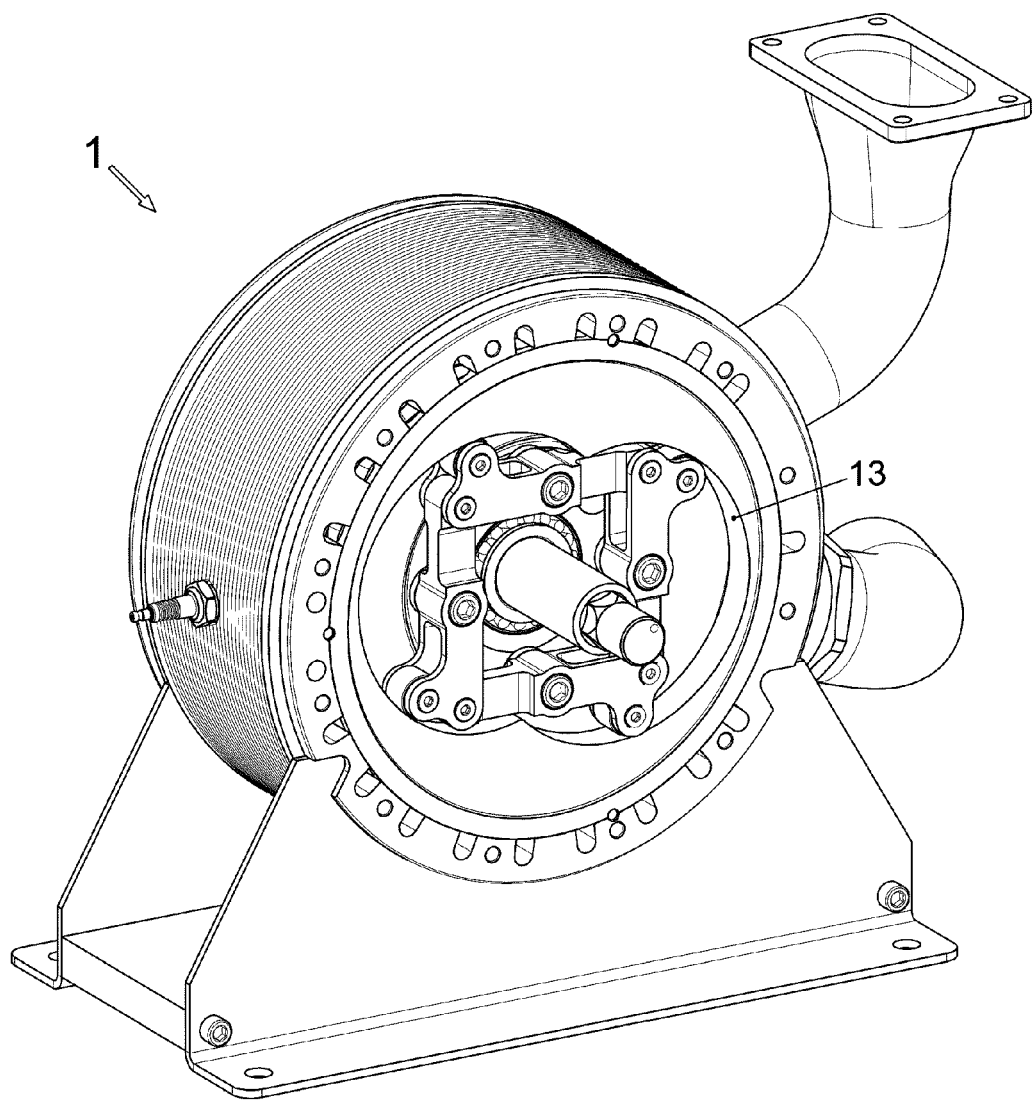
FIG. 10 shows the assembly of the engine with an opening to show a cam profile.

The linked structure 12, thus bound to the discoidal sectors 7 and 7', causes an exchange of forces between them, relating the motions of the first discoidal sector 7 to the second discoidal sector 7'. Only the cam profile 13 is still to be described; the cam profile forces a determined motion of the linked structure 12 to get the discoidal sectors 7 and 7', and therefore the pistons 7a, 7c, 7'b, 7'd, to swap between the high and low speeds as required. The cam profile 13 can be seen in FIG. 10. The links 15 are provided with rollers 18 that are configured to roll along the cam profile 13, thus providing a bind to the linked structure 12.

As already mentioned, the cam profile 13 can adopt different shapes depending on the desired motion of the discoidal sectors 7 and 7'. The shape can be computed with the aid of computer programs for designing mechanisms, where a determined movement of the discoidal sectors can be forced and the locus of the path followed by the rollers 18 can be constructed; said locus will be the sought cam profile 13. By using this procedure it is possible, for example, to force the low speed v to be zero, thus leaving the tangential piston 7a, 7c, 7'b or 7'd that is the backward one at the time of the expansion completely levered; other combinations are also possible. However, in this embodiment the cam profile necessary for the alternating of the discoidal sectors between a high speed V and a low speed v according to the disclosed example is shaped as a pseudo-epicycloid of two lobes.

3) Integration of the Speeds of the Discoidal Sectors

It has been explained how to move alternatively at a low speed v and at a high speed V the discoidal sectors 7 and 7' driven by virtue of the successive phases of expansion that take place in the chambers Cab, Cbc, Ccd, Cda. It is now described how to sum the speeds of the two discoidal sectors to make the shaft rotate at a constant speed.

The speed integration means 8 of this embodiment can be seen in FIGS. 3a and 4a, and comprises some conical pinions 10 housed in a cylindrical cage, which are provided with elastic washers 27 and are fixed to the shaft 9 and engaged to crown wheels 11 of the first and second discoidal sectors. The result of this configuration is that the output speed of the shaft 9 is the mean of the speeds of the discoidal sectors 7 and 7'. In this case, the cam profile 13 is designed for the sum of the speeds of the two discoidal sectors to be V+v. Therefore, the rotational speed of the shaft 9 is constant and equal to (V+v)/2.

Figure 11:
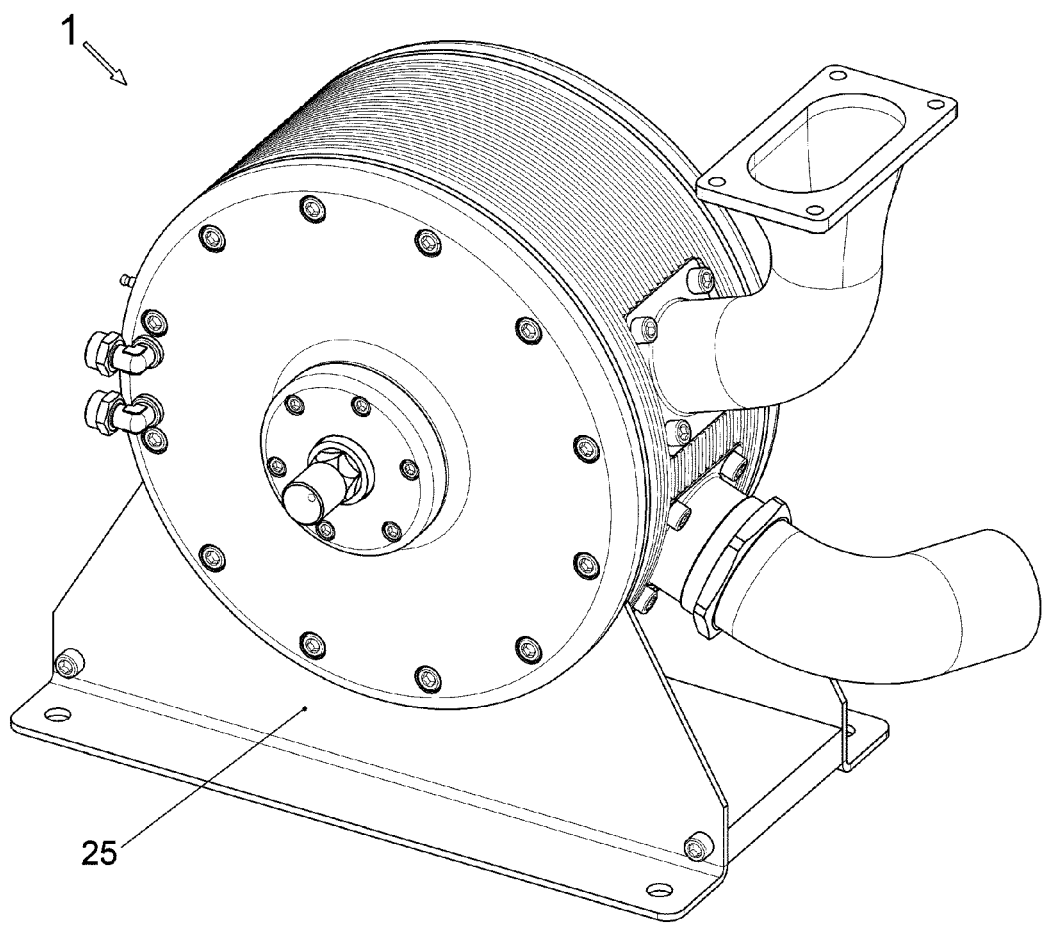
FIG. 11 shows the assembled engine, closed and supported by a holder (only to mount a prototype on a table).

Finally, FIG. 11 shows the final assembly of the engine 1 of the invention, closed and mounted on a holder 25.

Although only particular embodiments of the invention have been shown and described in the present specification, the skilled man will be able to introduce modifications and substitute any technical features thereof with others that are technically equivalent, depending on the particular requirements of each case, without departing from the scope of protection defined by the appended claims.

The invention claimed is:

1. A heat engine comprising:
   a body provided with an annular cavity therein;
   two coaxial discoidal sectors that jointly define at least four chambers in the annular cavity;
   a mechanism of control of a rotational speed of the two discoidal sectors that makes their respective rotational speeds to vary cyclically and in antiphase between a maximum speed and a minimum speed, so that the volume of the chambers varies too;

said speed control mechanism comprising a linked structure provided with four links arranged in a deformable parallelogram that is parallel to the discoidal sectors, said links being connected to each other by corresponding rotary joints located at their ends, and each link comprising a roller located adjacent one end of the link;

the speed control mechanism further comprising at least one cam profile for the rollers to follow, the cam profile extending in parallel to the discoidal sectors;

wherein:

a shape of the cam profile is the locus of the path followed by the rollers when the discoidal sectors follow a determined motion, said determined motion being such that the speed of each discoidal sector is kept at a maximum for at least 90% of the duration of a half-cycle, and is kept at a minimum for at least 90% of the duration of the other half-cycle.

2. The heat engine according to claim 1, wherein each discoidal sector comprises at least two diametrically opposite tangential pistons that project, both radially and axially, from their corresponding discoidal sector and are configured to slide through the annular cavity in the body, each pair of consecutive pistons, one from one sector and the other from the other sector, defining one of the mentioned chambers in said annular cavity, said tangential pistons being hollow.

3. The heat engine according to claim 2, wherein the tangential pistons comprise some radial retainers which are flat plates configured to be elastically curved during their assembly.

4. The heat engine according to claim 3, wherein the speed control mechanism comprises two deformable parallelograms provided with four links and two cam profiles, the deformable parallelograms being axially spaced and each link being provided with its corresponding roller, and the cam profiles extending in parallel to the discoidal sectors in such a way that the rollers of one deformable parallelogram can roll along one of the cam profiles and the rollers of the other deformable parallelogram can roll along the other cam profile.

5. The heat engine according to claim 4, wherein the linked structure is connected to the two discoidal sectors a plurality of bars that are perpendicular thereto, configured in such a way that a first pair of bars passes through two diametrically opposite orifices made in the first discoidal sector and through two diametrically opposite tangential slots made in the second discoidal sector, and that a second pair of bars passes through two diametrically opposite tangential slots made in the first discoidal sector and through two diametrically opposite orifices made in the second discoidal sector.

6. The heat engine according to claim 5, wherein the links are connected to the bars by joints that are located at the midpoint of every link.

7. The heat engine according to claim 5, comprising a transmission shaft that is concentrically disposed in the annular cavity and four conical pinions that are uniformly spaced around the transmission shaft and are engaged to crown wheels provided in the discoidal sectors.

8. The heat engine according to claim 4, comprising a transmission shaft that is concentrically disposed in the annular cavity and four conical pinions that are uniformly spaced around the transmission shaft and are engaged to crown wheels provided in the discoidal sectors.

9. The heat engine according to claim 2, wherein the speed control mechanism comprises two deformable parallelograms provided with four links and two cam profiles, the deformable parallelograms being axially spaced and each link being provided with its corresponding roller, and the cam profiles extending in parallel to the discoidal sectors in such a way that the rollers of one deformable parallelogram can roll along one of the cam profiles and the rollers of the other deformable parallelogram can roll along the other cam profile.

10. The heat engine according to claim 9, comprising a transmission shaft that is concentrically disposed in the annular cavity and four conical pinions that are uniformly spaced around the transmission shaft and are engaged to crown wheels provided in the discoidal sectors.

11. The heat engine according to claim 1, wherein the speed control mechanism comprises two deformable parallelograms provided with four links and two cam profiles, the deformable parallelograms being axially spaced and each link being provided with its corresponding roller, and the cam profiles extending in parallel to the discoidal sectors in such a way that the rollers of one deformable parallelogram can roll along one of the cam profiles and the rollers of the other deformable parallelogram can roll along the other cam profile.

12. The heat engine according to claim 11, wherein the linked structure is connected to the two discoidal sectors by a plurality of bars that are perpendicular thereto, configured in such a way that a first pair of bars passes through two diametrically opposite orifices made in the first discoidal sector and through two diametrically opposite tangential slots made in the second discoidal sector, and that a second pair of bars passes through two diametrically opposite tangential slots made in the first discoidal sector and through two diametrically opposite orifices made in the second discoidal sector.

13. The heat engine according to claim 12, wherein the links are connected to the bars by joints that are located at the midpoint of every link.

14. The heat engine according to claim 12, comprising a transmission shaft that is concentrically disposed in the annular cavity and four conical pinions that are uniformly spaced around the transmission shaft and are engaged to crown wheels provided in the discoidal sectors.

15. The heat engine according to claim 11, comprising a transmission shaft that is concentrically disposed in the annular cavity and four conical pinions that are uniformly spaced around the transmission shaft and are engaged to crown wheels provided in the discoidal sectors.

16. The heat engine according to claim 1, wherein the linked structure is connected to the two discoidal sectors by a plurality of bars that are perpendicular thereto, configured in such a way that a first pair of bars passes through two diametrically opposite orifices made in the first discoidal sector and through two diametrically opposite tangential slots made in the second discoidal sector, and that a second pair of bars passes through two diametrically opposite tangential slots made in the first discoidal sector and through two diametrically opposite orifices made in the second discoidal sector.

17. The heat engine according to claim 16, wherein the links are connected to the bars by joints that are located at the midpoint of every link.

18. The heat engine according to claim 16, comprising a transmission shaft that is concentrically disposed in the annular cavity and four conical pinions that are uniformly spaced around the transmission shaft and are engaged to crown wheels provided in the discoidal sectors.

19. The heat engine according to claim 1, comprising a transmission shaft that is concentrically disposed in the annular cavity and four conical pinions that are uniformly spaced around the transmission shaft and are engaged to crown wheels provided in the discoidal sectors.

20. The heat engine according to claim 1, wherein the shape of the cam profile is such that the ratio between the maximum speed and the minimum speed of any discoidal sector is between 4 and 5.

* * * * *